(12) United States Patent
Siriwardane et al.

(10) Patent No.: US 11,059,721 B2
(45) Date of Patent: Jul. 13, 2021

(54) PRODUCTION OF SYNTHESIS GAS FROM NATURAL GAS WITH COPPER—IRON—MANGANESE OXIDE OXYGEN CARRIERS/CATALYSTS VIA PARTIAL OXIDATION AND DRY REFORMING PROCESSES

(71) Applicant: United States Department of Energy, Washington, DC (US)

(72) Inventors: Ranjani Siriwardane, Morgantown, WV (US); William Benincosa, Morgantown, WV (US)

(73) Assignee: U.S. Department of Energy, Washington, DC (US)

(*) Notice: Subject to any disclaimer, the term of this patent is extended or adjusted under 35 U.S.C. 154(b) by 748 days.

(21) Appl. No.: 15/787,980

(22) Filed: Oct. 19, 2017

(65) Prior Publication Data
US 2019/0119109 A1   Apr. 25, 2019

(51) Int. Cl.
*C01B 3/40* (2006.01)
*B01J 23/00* (2006.01)
(Continued)

(52) U.S. Cl.
CPC ............... *C01B 3/40* (2013.01); *B01J 21/04* (2013.01); *B01J 21/20* (2013.01); *B01J 23/002* (2013.01);
(Continued)

(58) Field of Classification Search
CPC . B01J 21/20; B01J 23/00; B01J 23/002; C10J 2300/093; C10J 2300/0976;
(Continued)

(56) References Cited

U.S. PATENT DOCUMENTS

2016/0332150 A1* 11/2016 Fan ................... B01J 23/002

OTHER PUBLICATIONS

Hossain et al. "Chemical-looping combustion (CLC) for inherent CO2 separations—a review" Chemical Engineering Science 63 (2008) 4433-4451 (Year: 2008).*

(Continued)

*Primary Examiner* — Anthony J Zimmer
*Assistant Examiner* — Syed T Iqbal
(74) *Attorney, Agent, or Firm* — Timothy L. Harney; Michael J. Dobbs; Brian J. Lally

(57) ABSTRACT

Materials, methods of making, and methods of providing a trimetallic oxygen carrier for converting methane containing fuel to synthesis gas. The trimetallic oxygen carrier comprises $Cu_xFe_yMn_zO_t$, where $Cu_xFe_yMn_zO_t$ is a chemical composition with $0<x\le3$ and $0<y\le3$ and $0<z\le3$ and, $0<t\le5$. For example, $Cu_xFe_yMn_zO_t$ may be one of $CuMnFeO_4$, $CuFe_{0.5}Mn_{1.5}O_4$, $CuFeMn_2O_4$, $CuFe_2MnO_4$, or Cu impregnated on FerMnsOu, Fe impregnated on CurMnsOu, Mn impregnated on CurFesOu where r>0, s>0 and u>0 and combinations thereof. Reaction of trimetallic $Cu_xFe_yMn_zO_t$ with methane generates a product stream comprising at least 50 vol. % CO and $H_2$.

11 Claims, 13 Drawing Sheets

(51) Int. Cl.
*B01J 23/72* (2006.01)
*B01J 23/745* (2006.01)
*B01J 23/889* (2006.01)
*B01J 21/20* (2006.01)
*C01B 3/38* (2006.01)
*B01J 37/04* (2006.01)
*B01J 21/04* (2006.01)
*B01J 37/08* (2006.01)
*B01J 37/02* (2006.01)

(52) U.S. Cl.
CPC .............. *B01J 23/72* (2013.01); *B01J 23/745* (2013.01); *B01J 23/8892* (2013.01); *B01J 37/0201* (2013.01); *B01J 37/04* (2013.01); *B01J 37/082* (2013.01); *C01B 3/388* (2013.01); *B01J 2523/00* (2013.01); *B01J 2523/17* (2013.01); *B01J 2523/72* (2013.01); *B01J 2523/842* (2013.01); *C01B 2203/0261* (2013.01); *C01B 2203/1082* (2013.01); *C01B 2203/1241* (2013.01); *C01B 2203/1614* (2013.01)

(58) Field of Classification Search
CPC .... C10J 2300/0983; C10J 3/466; F23C 10/04; F23C 2900/99008; F23C 99/00; Y02E 20/346
See application file for complete search history.

(56) References Cited

OTHER PUBLICATIONS

Fan et al. "Trimetallic Oxygen Carriers CuFeMnO4, CuFeMn2O4, and CuFe0.5Mn1.5O4 for Chemical Looping Combustion" Energy Fuels 2015, 29, 6616-6624 (Year: 2015).*

* cited by examiner

Fig. 9A
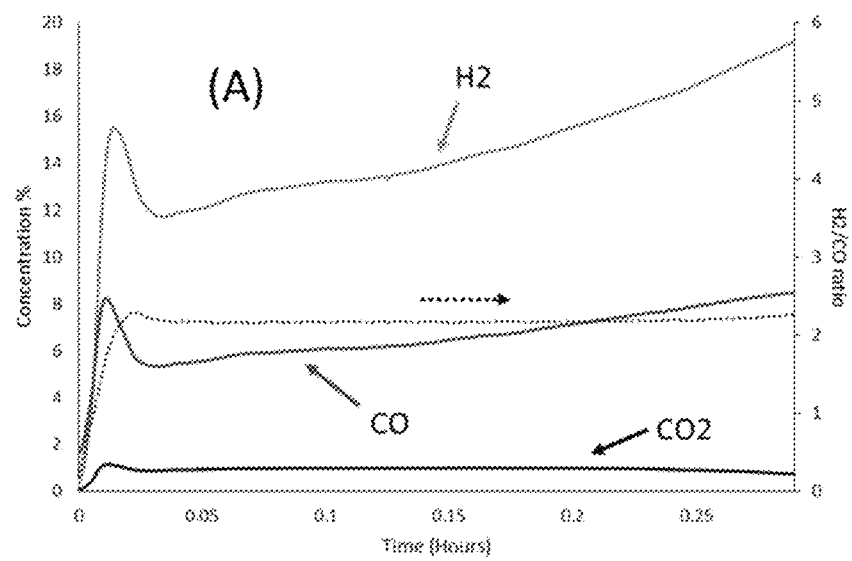
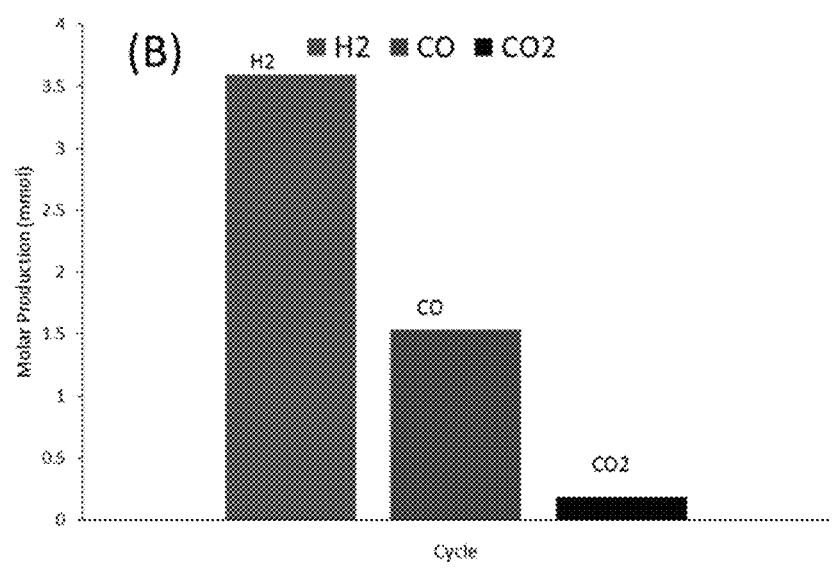
Fig. 9B

PRODUCTION OF SYNTHESIS GAS FROM NATURAL GAS WITH COPPER—IRON—MANGANESE OXIDE OXYGEN CARRIERS/CATALYSTS VIA PARTIAL OXIDATION AND DRY REFORMING PROCESSES

STATEMENT OF GOVERNMENT SUPPORT

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments consistent with the present disclosure relate to producing a synthesis gas stream free of nitrogen from natural gas. More specifically, one or more embodiments relate to development of novel Cu—Fe—Mn oxide catalyst/oxygen carrier, for conversion of methane to synthesis gas. The Cu—Fe—Mn oxide may be used in a chemical looping process to produce synthesis gas from methane and heat from oxidation of reduced trimetallic oxide with air. In another embodiment, the Cu—Fe—Mn oxide is used as catalyst for continuous production of synthesis gas from methane with a continuous stream of oxygen steam. In another embodiment, the Cu—Fe—Mn oxide is used as a catalyst for continuous production of synthesis gas from dry reforming of methane with a continuous stream of carbon dioxide. In another embodiment, the Cu—Fe—Mn oxide is used an oxygen carrier in chemical looping dry reforming process to produce syngas from fuel and CO from the oxidation of the reduced trimetallic oxide with carbon dioxide.

BACKGROUND

Natural gas is a low-cost C-containing feedstock and one of the most abundant fuels in U.S. The major component of natural gas is methane. Large quantities of natural gas are flared in many processes releasing greenhouse gases $CO_2$ and unburned $CH_4$. It is critical to find more efficient and clean processes to utilize the natural gas reserves. Direct conversion of methane to useful chemicals or fuels has been explored and it requires multi-step processes at high temperature. The most economical method to produce valuable chemicals from methane is via synthesis gas followed by different chemical processes to manufacture the desired chemicals. In a large scale industrial plant, the production of synthesis gas accounts for the major cost. Therefore, it is important to develop more efficient methods for the conversion of methane to synthesis gas. Steam methane reforming (SMR) is the current commercial process for conversion of methane to synthesis gas. SMR shown in reaction [1] is an endothermic reaction.

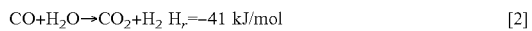

SMR reaction is conducted at high temperatures to obtain high syngas yields which contributes to very high energy consumption. After the SMR reaction, water gas shift (Eq. 2) reaction is performed to increase the $H_2/CO$ ratio for various applications:

Three processes described below are alternate methods to SMR to produce syngas from methane.

Process 1: Catalytic Partial Oxidation

Partial oxidation of methane (POM) is a one step process to form $H_2$ and CO at a ratio of 2 (Eq. 3) from methane:

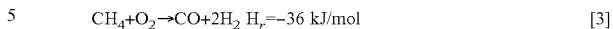

Partial oxidation reaction may be conducted auto thermally because of the mild exothermicity of the reaction. Another big advantage is that the $H_2/CO$ ratio of 2 may be obtained without using an additional water gas shift reactor and this is ideal for most downstream chemical production processes.

Catalysts have been utilized to increase the reaction rates of POM. In the catalytic partial oxidation of methane (CPOM) reaction, catalysts such as noble metal (Pt, Rh, Ir, Pd) and non-noble metal (Ni, Co) have been used to convert methane with oxygen (or air) to syngas in a single step process (See Saleh A. Al-Sayari, Recent Developments in the Partial Oxidation of Methane to Syngas, The Open Catalysis Journal, 2013, 6, 17-28, incorporated herein by reference in its entirety). High reaction rates with temperatures exceeding 1000° C. due to auto thermal reaction have been obtained with the CPOM Reaction 3. The contact times necessary for CPOM is significantly lower than that for SMR. All these advantages make CPOM a promising and more efficient technology than SMR.

Noble metals such as Pd, Ir, Ru and Pt have been used as catalysts in CPOM but they are very expensive. Ni-based catalysts which are less expensive have been used but their reactivity is less than that with noble metals. Additionally Ni suffers from deactivation mainly due to sintering and carbon deposition. In addition, Ni is a suspected carcinogen and additional costs are needed for safe handling of the materials.

In one or more embodiments, Cu—Fe—Mn trimetallic oxides perform as catalysts for the CPOM process with a continuous oxygen stream to continuously convert methane to syngas. The continuous oxygen stream may be provided by oxygen separated from air or chemical looping oxygen uncoupling process.

Process 2: Chemical Looping Partial Oxidation

When air is used as the oxygen source in the CPOM process (reaction 3) the synthesis gas produced from methane is diluted by $N_2$. In addition, there are safety issues when mixing air and methane in the CPOM process. In order to produce nitrogen free syngas in the CPOM process, an air separation unit to provide pure oxygen is required which makes the process very expensive.

Chemical looping (CL) partial oxidation of methane (see M. Ryden, A. Lyngfelt, t. Matteson, Chemical looping combustion and reforming in a circulating fluid bed using Ni-based oxygen carriers, Energy and Fuels 2008, 22, 2585-97, incorporated herein by reference in its entirety) has been considered as an alternate method to overcome these issues. In CL partial oxidation of methane which consists of two reactors, oxygen from an oxygen carrier such as metal oxide is used for converting methane to syngas in the first reactor and a reduced oxygen carrier is oxidized with air in the second reactor to avoid mixing of fuel and air. Development of suitable oxygen carriers that perform partial oxidation of methane to produce syngas without combusting methane has been a major barrier for the CL partial oxidation of methane.

Various oxygen carriers have been reported but reactivities have been low. Ni, Fe, La, ceria, perovskites (See U.S. Pat. No. 6,143,203 to Zeng et al U.S. Patent No. 2008/0164443 to White et al, each of which is incorporated herein by reference in its entirety) based materials have been reported. Ni based materials have environmental issues while Ceria and La based materials are expensive.

In one or more embodiments, Cu—Fe—Mn trimetallic oxides are contemplated as oxygen carriers for methane chemical looping partial oxidation process. These materials are environmentally safe and may be prepared using readily available materials contributing to a lower cost.

Process 3: Catalytic Dry Reforming

Catalytic dry reforming is a process that converts methane and carbon dioxide, two greenhouse gases to synthesis gas as illustrated in reaction 4.

$$CH_4+CO_2 \leftrightarrows 2\ CO+2H_2 \Delta H_R=+205\ kJ*mol^{-1}\ at\ 298\ K \qquad [4]$$

The production of syngas via catalytic dry reforming is a promising alternative to the commercial SMR process illustrated in reaction [1] since excess steam is not required for the process, and for the conversion of carbon dioxide to useful products.

A technoeconomic analysis (see Kartick Monda, Sankar Sasmal, Srikant Badgandi, Dipabali Roy Chowdhury & Vinod Nair, Dry reforming of methane to syngas: a potential alternative process for value added chemicals—a technoeconomic perspective, Environ Sci Pollut Res (2016) 23:22267-22273 DOI 10.1007/s11356-016-6310-4, incorporated herein by reference in its entirety) indicated that dry reforming of natural gas/$CO_2$ has a lower operating and capital costs in comparison with steam reforming assuming negligible cost of $CO_2$ import.

Various catalysts have been reported for the dry reforming process. Review on dry reforming of methane, a potentially more environmentally-friendly approach to the increasing natural gas exploitation, Frontiers in chemistry, published: 11 Nov. 2014 doi: 10.3389/fchem.2014.00081 and WIPO Application WO 20141645592 A1 to Meissner et al, incorporated herein by reference in its entirety) but there are issues with commercialization.

Noble metals (Pt, Pd, Rh, Ru) have been reported as promising catalysts for methane dry reforming but they are very expensive. Non-noble transition metals such as Ni, Co, Fe have been reported and Ni has shown the most promising results. However, deactivation and safety problems are some of the issues with Ni based catalysts. Development of better catalysts for the dry reforming process is necessary for commercializing this technology.

In the current invention, we are describing use of Cu—Fe—Mn trimetallic oxides as a catalyst for methane dry reforming process which showed very promising performance. These materials do not have any environmental safety issues and may be easily prepared contributing to a low cost. The continuous carbon dioxide stream and heat may be provided by chemical looping combustion of a fuel with an oxygen carrier.

Process 4: Chemical Looping Dry Reforming

In this process reported in the literature, conversion of $CO_2$ to CO is done by using $CO_2$ as an oxidant in a process called "Chemical Looping Dry Reforming" (CLDR) (See Vladimir V. Galvitaa, Hilde Poelmana, Christophe Detavernierb, Guy B. Marin, "Catalyst-assisted chemical looping for $CO_2$ conversion to CO", Applied Catalysis B: Environmental 164 (2015) 184-191; and WIPO Patent Application WO 2014016790 A1 to Idriss et al., incorporated herein by reference in its entirety).

In the CLDR process, carbon dioxide is used for oxidation of the reduced oxygen carrier instead of using air as an oxidant as is the common practice in conventional chemical looping combustion (CLC) or in place of steam in the chemical looping steam reforming process. Either methane or coal may be used as the fuel for initial reduction of the oxygen carrier (MeO) to produce the reduced metal (Me) while as the fuel is oxidized. Instead of combusting the fuel fully, this initial reduction reaction of MeO may also be used to produce a useful product such as CO or synthesis gas from fuel as illustrated in reactions [5], [6] and [7]. Then the reduced oxygen carrier (Me) is oxidized with $CO_2$ to form CO and MeO as shown in reaction [8].

Reduction of oxygen carrier (MO):

$$3MeO+2C=3Me+CO+CO_2 \qquad [5]$$

$$MeO+2C+H_2O=Me+2CO+H_2 \qquad [6]$$

$$MeO+CH_4=Me+CO+2H_2 \qquad [7]$$

Oxidizer:

$$Me+CO_2=MeO+CO \qquad [8]$$

Since $CO_2$ is a highly stable molecule and a weak oxidant, selection of an oxygen carrier to perform the oxidation reaction is important for this process. Stability of oxygen carriers at extended high-temperature cyclic operation and carbon formation during oxidation with $CO_2$ are additional challenges. Additionally, slower oxidation kinetics using $CO_2$ in place of oxygen (air) that is used in CLC need to be addressed.

In the current invention, use of Cu—Fe—Mn trimetallic oxygen carriers for chemical looping dry reforming to convert $CO_2$ to CO is described. Very high conversions of $CO_2$ to CO were observed via reaction [8] with the Group II metal ferrites in this invention. The continuous carbon dioxide stream and heat may be provided by chemical looping combustion of a fuel with an oxygen carrier.

One or more advantages of embodiments of the invented PEI/epoxysilane/$SiO_2$ sorbents over existing sorbent materials include the fast and easy preparation procedure, the low raw material costs, recyclability, and the lack of sodium, potassium, calcium, and magnesium adsorption. The absence of a Na, K, Ca, and Mg affinities exhibited by the invented sorbent indicates that the sorbent will capture valuable REEs and toxic heavy metals from various $H_2O$ sources without interference from some unwanted or non-valuable ions.

These and other objects, aspects, and advantages of the present disclosure will become better understood with reference to the accompanying description and claims.

SUMMARY

Embodiments of the invention relate to a trimetallic oxygen carrier $Cu_xFe_yMn_zO_t$ having improved durability and reactivity for conversion of methane to synthesis gas not diluted with nitrogen, over metal oxides currently used in the three processes: chemical looping partial oxidation of methane, catalytic partial oxidation of methane and catalytic dry reforming of methane with $CO_2$. The trimetallic oxygen carrier comprises $Cu_xFe_yMn_zO_t$, where $Cu_xFe_yMn_zO_t$ is a chemical composition with $0<x\leq3$ and $0<y\leq3$ and $0<z\leq3$ and, $0<t\leq5$. For example, $Cu_xFe_yMn_zO_t$ may be one of $CuFe_2MnO_4$, $CuFe_{0.5}MnO_4$, $CuFe\ Mn_2O_4$, $CuFeMnO_4$, or Cu impregnated on $Fe_rMn_sO_u$, Fe impregnated on $Cu_rMn_s O_u$, Mn impregnated on $Cu_rFe_sO_u$ where $r>0$, $s>0$ and $u>0$ and combinations thereof. Trimetallic oxide oxygen carrier may also be supported on a support such as alumina, silica, zirconia, magnesium oxide, calcium oxide or titania or the reactor vessel containing the trimetallic oxide may be diluted with inert material such as alumina, silica, zirconia, magnesium oxide, calcium oxide or titania.

In an embodiment, the trimetallic $Cu_xFe_yMn_zO_t$ oxygen carrier may be utilized for the chemical looping partial oxidation of methane by delivering the trimetallic oxygen carrier to a fuel reactor and introducing methane to the trimetallic oxygen carrier at a reducing temperature, such that some portion of the trimetallic oxygen carrier is reduced and some portion of the methane is oxidized. Within the fuel reactor, the trimetallic oxygen carrier may interact with methane or any fuel initially to combust the fuel completely while forming a partially reduced form of the original trimetallic oxide. This partially reduced form of the original tri-metallic oxide further interacts with methane to produce synthesis gas while getting reduced further to form compounds comprising some portion the $Cu_xFe_yMn_zO_r$, $Cu_jFe_qMn_pO_r$, Cu, $Cu_2O$, Fe, $Fe_3O_4$, FeO, MnO and Mn components where $Cu_jFe_qMn_pO_r$ is a reduced form of $Cu_xFe_yMn_zO_t$. The reduction of the trimetallic oxygen carrier $Cu_xFe_yMn_zO_t$ and partial oxidation of methane at the reducing temperature generates a product stream comprising at least 50 vol. % CO and $H_2$. After the syngas production is completed, the reduced $Cu_xFe_yMn_zO_t$ oxygen carrier is transferred to the air reactor for oxidation and the oxidized oxygen carrier is transferred back to the fuel reactor for the next cycle. In an embodiment, the reducing and oxidizing temperatures range from about 600° C. to about 1100° C.

In another embodiment, the trimetallic $Cu_xFe_yMn_zO_t$ or partially reduced trimetallic $Cu_xFe_yMn_zO_t$ may also be used a catalyst for partial oxidation of methane by continuous reaction of methane and oxygen. The oxygen stream may be supplied by air, or oxygen separated by air or oxygen from chemical looping un-coupling process which involves decomposition of metal oxide such as copper oxide, manganese oxide, or metal peroxides. The methane and oxygen streams are supplied simultaneously to the trimetallic catalyst. The trimetallic $Cu_xFe_yMn_zO_t$ catalyst gets continuously reduced by methane while producing syngas but immediately gets oxidized by the oxygen stream supplied simultaneously with methane. The reduction of the trimetallic oxygen carrier and oxidation of the methane generate a product stream comprising at least 50 vol. % CO and $H_2$. In an embodiment, the reaction temperatures range from about 600° C. to about 1100° C. The process is operated continuously.

In another embodiment, trimetallic $Cu_xFe_yMn_zO_t$ or partially reduced $Cu_xFe_yMn_zO_t$ is used as a catalyst for methane dry reforming process with carbon dioxide is described. In this process, syngas is produced continuously from the reaction of methane and carbon dioxide gas streams in the presence of trimetallic catalyst $Cu_xFe_yMn_zO_t$. The carbon dioxide stream and heat may be supplied from a chemical looping reactor. The trimetallic $Cu_xFe_yMn_zO_t$ catalysts showed very promising performance for continuous syngas production from methane and $CO_2$. The process generates a product stream comprising at least 50 vol. % CO and $H_2$. These trimetallic $Cu_xFe_yMn_zO_t$ catalysts reported in this invention are low cost and environmentally safe. In an embodiment, the reaction temperatures are from about 600° C. to about 1100° C. The process is operated continuously.

In another embodiment, the $Cu_xFe_yMn_zO_t$ or partially reduced $Cu_xFe_yMn_zO_t$ oxygen carrier may be utilized for the chemical looping dry reforming by delivering the metal ferrite oxygen carrier to a fuel reactor and introducing a fuel such as methane or coal to the metal ferrite oxygen carrier at a reducing temperature, such that some portion of the $Cu_xFe_yMn_zO_t$ oxygen carrier is reduced and some portion of the fuel is oxidized. Within the fuel reactor, the $Cu_xFe_yMn_zO_t$ oxygen carrier interacts with the fuel generates a reduced carrier. The reduction of the metal ferrite oxygen carrier may oxidize the fuel fully to produce $CO_2$ and $H_2O$ or partially oxidize the fuel at the reducing temperature generating a product stream comprising at least 50 vol. % CO and/or $H_2$. After the reduction of the oxygen carrier is completed, the reduced oxygen carrier is transferred to the oxidation reactor for oxidation with carbon dioxide containing gas stream to produce CO. The carbon dioxide stream and heat may be supplied from a chemical looping reactor. The oxidized oxygen carrier after oxidation with carbon dioxide is transferred back to the fuel reactor for the next cycle. In an embodiment, the reducing and oxidizing temperatures range from about 500° C. to about 1100° C.

Embodiments of the trimetallic oxygen carriers $Cu_xFe_yMn_zO_t$ disclosed are further demonstrated and described in the following description Embodiments of the trimetallic oxygen carriers $Cu_xFe_yMn_zO_t$ disclosed are further demonstrated and described in the following description.

BRIEF DESCRIPTION OF THE DRAWINGS

These and other features, aspects, and advantages of the multiple embodiments of the present invention will become better understood with reference to the following description, appended claims, and accompanied drawings where:

(FIG. 6B);

(FIG. 8B);

FIGS. 9A and 9B depict the effluent gas concentration (FIG. 9A) and Molar gas products with $Cu_xFe_yMn_zO_t$ during fixed bed flow reactor tests with 20% methane and controlled oxidation with air to eliminate the initial $CO_2$ formation due to methane combustion (FIG. 9B);

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide description of amorphous, organic-functionalized sorbent materials, methods of their preparation, and methods for using such materials.

One or more embodiments consistent with the present invention relate to producing a synthesis gas stream free of nitrogen from catalytic partial oxidation of methane using a trimetallic oxide catalyst/oxygen carrier prepared using copper-manganese-iron oxides. The trimetallic oxide comprises Cu$_x$Fe$_y$Mn$_z$O$_t$, where 0<x≤3 and 0<y≤3 and 0<z≤3 and, 0<t≤5. Another embodiment relates to use of trimetallic Cu$_x$Fe$_y$Mn$_z$O$_t$, as an oxygen carrier in chemical looping partial oxidation. Yet another embodiment is related to a catalytic process by using Cu$_x$Fe$_y$Mn$_z$O$_t$ combined with gaseous oxygen stream produced from air or chemical looping uncoupling to produce a continuous stream of synthesis gas stream free of nitrogen from methane. Still another embodiment is related to a catalytic dry reforming of methane using Cu$_x$Fe$_y$Mn$_z$O$_t$ as a catalyst to produce a continuous syngas stream from methane and carbon dioxide. Another embodiment is related to chemical looping dry reforming with methane and carbon dioxide using Cu$_x$Fe$_y$Mn$_z$O$_t$ as an oxygen carrier to produce syngas from methane and carbon monoxide from carbon dioxide. The gaseous carbon dioxide stream and heat for the dry reforming processes may be produced from chemical looping combustion of a fuel with an oxygen carrier.

In another embodiment, the trimetallic oxygen carrier comprises CuFe$_2$MnO$_4$, CuFe$_{0.5}$MnO$_4$, CuFeMn$_2$O$_4$, CuFeMnO$_4$, or Cu impregnated on FerMnsO$_u$, Fe impregnated on CurMnsOu, Mn impregnated on CurFesO$_u$ where r>0, s>0 and u>0 and combinations thereof. In particular embodiments, the Cu$_x$Fe$_y$Mn$_z$O$_t$ comprises at least 30 wt. % of the oxygen carrier. In certain embodiments, the trimetallic oxygen carrier further comprises a support. In an embodiment, the support comprises from about 5 wt. % to about 60 wt. % of the trimetallic oxygen carrier and the Cu$_x$Fe$_y$Mn$_z$O$_t$ comprises at least 40 wt. % of the trimetallic oxygen carrier. The support may consist of alumina, silica, titania, zirconia, MgO, CaO or alumino silicates or clay. In an embodiment, the support contain 20% alumina. Conversion of methane with the trimetallic oxygen carrier generates a product stream of syngas comprising at least 50 vol. % of the product stream.

Figure 1:
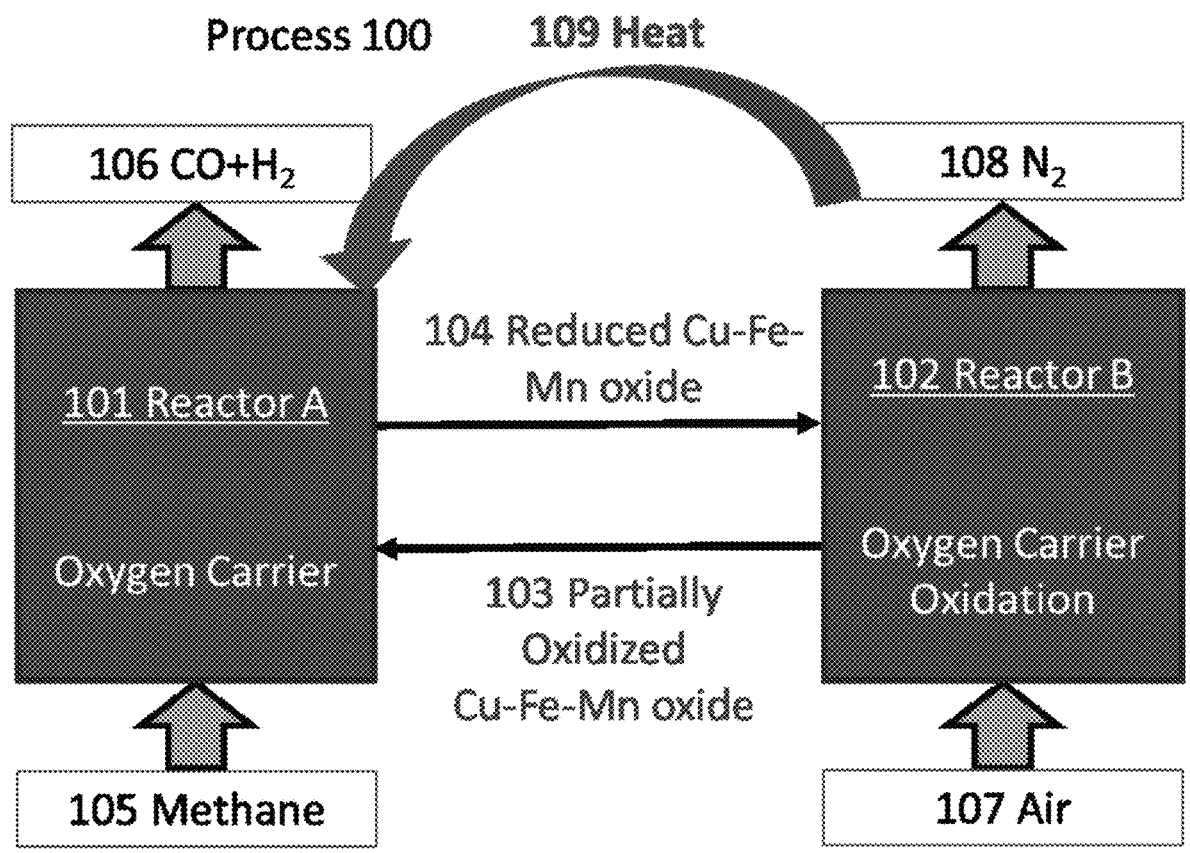
FIG. 1 depicts the cyclic process of chemical looping partial oxidation of methane to produce syngas with trimetallic $Cu_xFe_yMn_zO_t$ as the oxygen source and oxidation of reduced trimetallic with air.

A system 100 within which the trimetallic Cu$_x$Fe$_y$Mn$_z$O$_t$ oxygen carrier disclosed here may be utilized is illustrated in FIG. 1. Chemical looping partial oxidation of methane system includes a fuel reactor 101. Trimetallic Cu$_x$Fe$_y$Mn$_z$O$_t$ oxygen carrier 103 is placed in the fuel reactor A 101. Methane 105 is introduced to the fuel reactor 101 the partial oxidation reaction with trimetallic oxygen carrier 103. Fuel reactor 101 is at a reducing temperature sufficient to reduce at least a portion of the trimetallic oxygen carrier 103. In an embodiment, the reducing temperature is from about 700° C. to about 1100° C. The reaction involved in the fuel reactor 101 between trimetallic oxide 103 and methane 105 is shown in reaction [9].

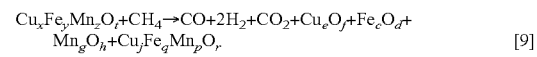
Cu$_x$Fe$_y$Mn$_z$O$_t$+CH$_4$→CO+2H$_2$+CO$_2$+Cu$_e$O$_f$+Fe$_c$O$_d$+ Mn$_g$O$_h$+Cu$_j$Fe$_q$Mn$_p$O$_r$.   [9]

Within fuel reactor 101, trimetallic oxygen carrier 103 interacts with methane 105, and the Cu$_x$Fe$_y$Mn$_z$O$_t$ trimetallic oxygen carrier 103 reduces to a reduced carrier 104 comprising one or more components of reduced form of the trimetallic Cu$_j$Fe$_q$Mn$_p$O$_r$, where r/(j+q+p)<t/(x+y+z), Cu$_e$O$_f$ where 0<e and f/e<1, Fe$_c$O$_d$ where 0<c and d/c<1.5, Mn$_g$O$_h$ where 0<g and h/g<1.5 component. For example, the Fe$_c$O$_d$ component may be Fe$^0$ or may be an iron oxide such as FeO and Fe$_3$O$_4$, among others, and Cu$_e$O$_f$ may be Cu$^0$ or Cu$_2$O, and Mn$_g$O$_h$ may be Mn$^0$ or MnO or Mn$_3$O$_4$. In an embodiment where the trimetallic oxygen carrier 103 is Cu$_x$Fe$_y$Mn$_z$O$_t$ on the support, interacts with methane 105 in reactor 101 and generates a reduced carrier comprising some portion of Cu$_x$Fe$_y$Mn$_z$O$_t$, Cu$_j$Fe$_q$Mn$_p$O$_r$, FeO, Fe$_3$O$_4$, Cu$^0$, Cu$_2$O, Mn$^0$, MnO or Mn$_3$O$_4$ or combinations of thereof in a support. In this embodiment, the support may consist of alumina, silica, titania, zirconia, MgO, CaO, alumino silicates or clay. The reducing temperature is sufficient to reduce some portion of the Cu$_x$Fe$_y$Mn$_z$O$_t$ oxygen carrier 103 and oxidize some portion of methane, generating syngas products 106 in the fuel reactor 101. The syngas products 106 are withdrawn from fuel reactor 101 as a product stream at exhaust, and the reduced carrier 104 may exit the fuel reactor. At the exhaust, at least 50 vol. % of the product stream 106 comprises CO and H$_2$. In an embodiment, at least 90 vol. % of the product stream 106 comprises CO and H$_2$.

The reduced trimetallic Cu$_x$Fe$_y$Mn$_z$O$_t$ oxygen carrier 104 exiting the fuel reactor may subsequently enter oxidation reactor B 102. Oxidation reactor B 102 further receives a flow of oxidizing gas such as air 107, and facilitates contact between the reduced trimetallic oxygen carrier 104 and the oxidizing gas, generating a re-oxidized trimetallic Cu$_x$Fe$_y$Mn$_z$O$_t$ carrier 103 as shown in reaction [10].

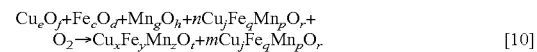
Cu$_e$O$_f$+Fe$_c$O$_d$+Mn$_g$O$_h$+nCu$_j$Fe$_q$Mn$_p$O$_r$+ O$_2$→Cu$_x$Fe$_y$Mn$_z$O$_t$+mCu$_j$Fe$_q$Mn$_p$O$_r$.   [10]

The product of the oxidizing reaction is the re-oxidized carrier 103, where the re-oxidized carrier comprises Cu$_x$Fe$_y$Mn$_z$O$_t$ or partially oxidized oxygen carrier Cu$_j$Fe$_q$Mn$_p$O$_r$. The oxygen carrier may contain a support. Generally, some of the Cu$_x$Fe$_y$Mn$_z$O$_t$ comprising the re-oxidized carrier 103 is equivalent to the Cu$_x$Fe$_y$Mn$_z$O$_t$ comprising the original trimetallic oxygen carrier. For example, when the trimetallic oxygen carrier 103 comprises Cu$_x$Fe$_y$Mn$_z$O$_t$ on the support and the reduced carrier 104 comprises FeO, Fe$_3$O$_4$, Cu$^0$, Cu$_2$O, Mn$^0$, MnO or Mn$_3$O$_4$, then the oxidation reaction generates a re-oxidized carrier 103 comprising Cu$_x$Fe$_y$Mn$_z$O$_t$ on the support. In an embodiment, when the oxidation in the oxygen carrier is conducted to partially oxidize the reduced oxygen carrier to form partially oxidized oxygen carrier, $Cu_qFe_qMn_pO_r$ reacts with methane in the fuel reactor as shown in reaction [11] to selectively form syngas with minimal formation of $CO_2$.

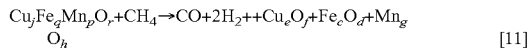
[11]

Oxidation reactor 102 is at an oxidation temperature sufficient to oxidize at least a portion of the reduced carrier partially or fully. In an embodiment, the oxidizing temperature ranges from about 700° C. to about 1100° C.

As used herein, to "reduce some portion of the trimetallic oxygen carrier" refers to the loss of oxygen from the $Cu_xFe_yMn_zO_t$ comprising the trimetallic oxygen carrier while "oxidation of some portion of oxygen carrier" refers to gaining oxygen. A "reducing temperature" is a temperature sufficient to generate reduction and an "oxidizing temperature" is a temperature sufficient to generate oxidation under other existing conditions.

The oxidizing reaction occurring in oxidation reactor 102 and oxygen containing gas stream such as air 107 is an exothermic reaction, and heat generated 109 is carried from oxidizing reactor 102 to 101. The gaseous flow 108 exiting from the oxidizing reactor 102 is comprised of the oxidizing gas less that oxygen utilized for the generation of the re-oxidized carrier. For example, when the flow of oxidizing gas is air, the gaseous flow exiting at 108 is comprised of $N_2$ and possibly some $O_2$, and other components. Heat 109 from the oxidizer may also be transferred to the fuel reactor 101 to provide heat for the syngas production by the reaction [5]. The re-oxidized carrier may be subsequently transported to fuel reactor 101 for use as the trimetallic oxygen carrier in a cyclic operation.

It is understood that FIG. 1 provides an exemplary application illustrating chemical looping partial oxidation of methane, and the like, however the specifics of the process illustrated are not intended to be limiting. Within this disclosure, it is only necessary that a $Cu_xFe_yMn_zO_t$ trimetallic oxygen carrier be delivered to a fuel reactor, where the trimetallic oxygen carrier comprises $Cu_xFe_yMn_zO_t$ where $0<x\leq3$ and $0<y\leq3$ and $0<z\leq3$ and, $0<t\leq5$ and that the trimetallic oxygen carrier contact methane containing gas stream at a reducing temperature sufficient to reduce some portion of the trimetallic oxygen carrier and oxidize some portion of methane to generate a product stream comprising at least 50 vol. % CO and $H_2$. In an embodiment, $Cu_xFe_yMn_zO_t$ is one of $CuMnFeO_4$, $CuFe_{0.5}Mn_{1.5}O_4$, $CuFeMn_2O_4$, $CuFe_2MnO_4$, or Cu impregnated on $FerMnsO_u$, Fe impregnated on $CurMnsOu$, Mn impregnated on $CurFesO_u$ where $r>0$, $s>0$ and $u>0$ and combinations thereof. In an embodiment, the support is alumina ($Al_2O_3$).

Figure 2:
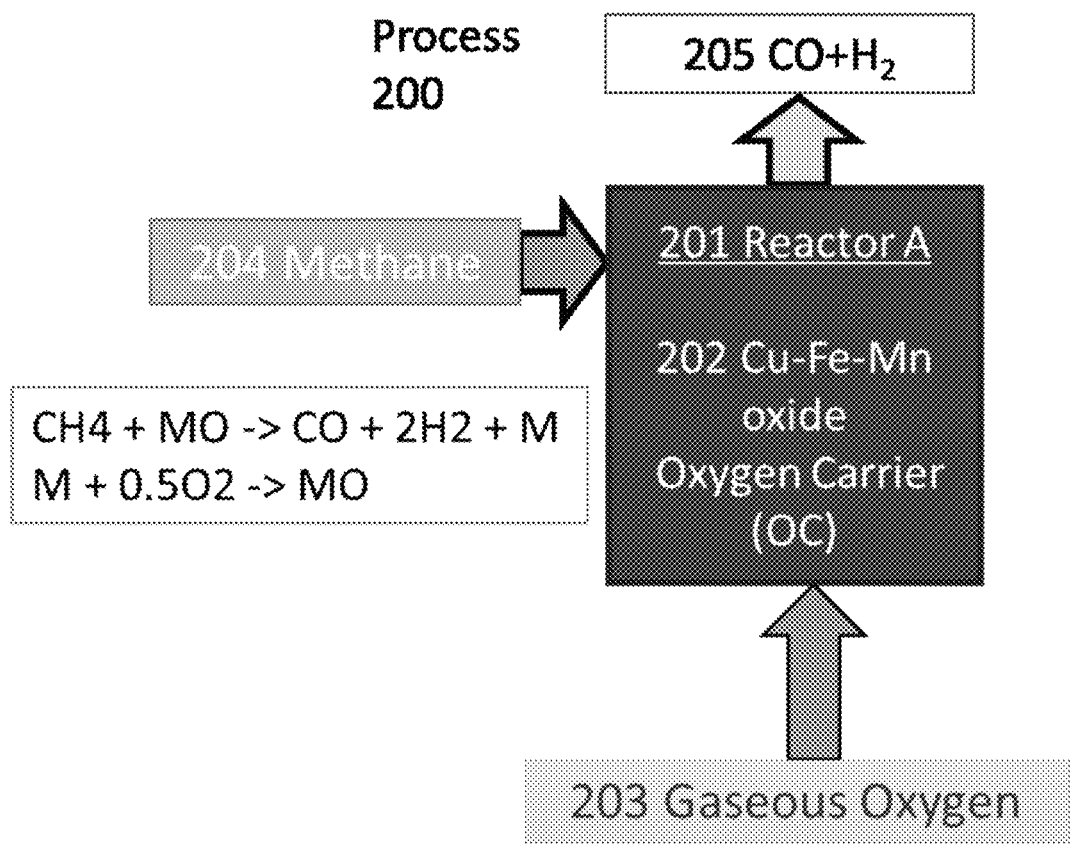
FIG. 2 depicts the process of continuous catalytic partial oxidation of methane using trimetallic $Cu_xFe_yMn_zO_t$ as the catalyst with a continuous gaseous stream of oxygen and methane

Another system 200 within which the trimetallic oxygen carrier $Cu_xFe_yMn_zO_t$ 202 may be utilized is illustrated at FIG. 2. In this process which involves a catalytic reactor A 201, trimetallic $Cu_xFe_yMn_zO_t$ 202 performs as a catalyst. A continuous flow of methane 204 mixed with gaseous oxygen 203 are introduced to the trimetallic $Cu_xFe_yMn_zO_t$ 202 placed in the catalytic reactor 201 to produce syngas 205. Catalytic reactor A 201 is at a temperature sufficient to convert methane 204 and oxygen 203 to syngas 205 in the presence of the trimetallic $Cu_xFe_yMn_zO_t$ catalyst 202 as shown in reaction [4]. In an embodiment, the reaction temperature ranges from about 700° C. to about 1100° C.

Gaseous oxygen stream 203 may be from oxygen separated from air. In an embodiment, a gaseous oxygen may be supplied from thermal decomposition as shown in reaction [12].

[12]

Materials for thermal decomposition to from oxygen may be selected from CuO, manganese oxides, barium peroxides, strontium peroxide, alkali metal peroxides such as sodium peroxide.

Figure 3:
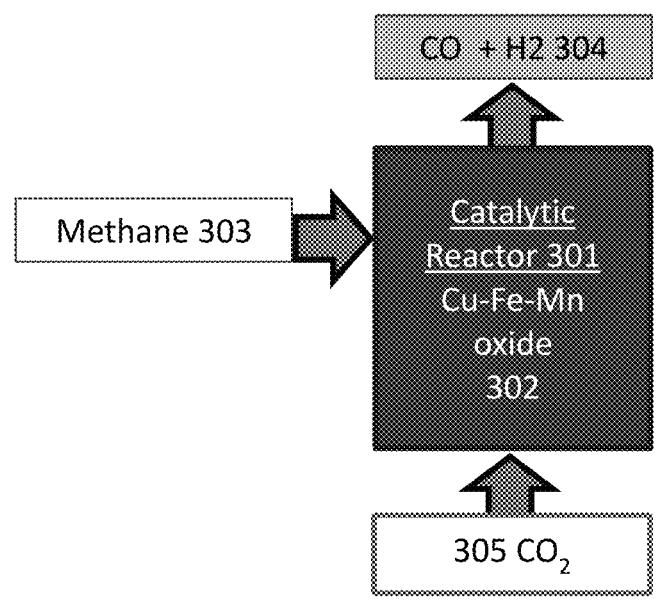
FIG. 3 depicts the process of continuous catalytic methane and $CO_2$ dry reforming process with $Cu_xFe_yMn_zO_t$.

Another system 300 within which the trimetallic catalyst may be utilized is illustrated at FIG. 3 which illustrates a catalytic dry reforming of methane/$CO_2$ system including a catalytic reactor 301. Trimetallic $Cu_xFe_yMn_zO_t$ catalyst 302 is placed in the catalytic reactor 301. Methane 303 and $CO_2$ 305 gaseous streams are introduced to the catalytic reactor 301 for the dry methane reforming reaction with trimetallic $Cu_xFe_yMn_zO_t$ catalyst 302. Catalytic reactor 301 is at a temperature sufficient for trimetallic $Cu_xFe_yMn_zO_t$ catalyst 302 to react with methane and $CO_2$ to produce syngas. In an embodiment, the temperature in the catalytic reactor is from about 500° C. to about 1100° C. The reaction involved in the catalytic reactor 301 between methane 303 and carbon dioxide 305 in the presence of trimetallic $Cu_xFe_yMn_zO_t$ catalyst 302 is shown in [4]. Within the catalytic reactor 301 trimetallic $Cu_xFe_yMn_zO_t$ catalyst 302 may be used in the oxidized form or in the reduced form where $0<x\leq3$ and $0<y\leq3$ and $0<z\leq3$ and, $0<t\leq5$. For example, the trimetallic catalyst 302 comprises $Cu_xFe_yMn_zO_t$ on the support or $Cu_xFe_yMn_zO_t$ may be mixed with inert material in the reactor bed. The trimetallic catalyst 302 may also comprise of mixture of reduced forms of $Cu_xFe_yMn_zO_t$ which consists of $Cu_fFe_qMn_pO_r$, FeO, $Fe_3O_4$, $Cu^0$, $Cu_2O$, $Mn^0$, MnO or $Mn_3O_4$. In the catalytic reactor 301, the reaction between methane 303 and carbon dioxide 305 in the presence of trimetallic $Cu_xFe_yMn_zO_t$ 302 produces syngas 304 comprises of CO and $H_2$. At the exhaust, at least 50 vol. % of the product stream 304 comprises CO and $H_2$. In an embodiment, at least 90 vol. % of the product stream 304 comprises CO and $H_2$.

Gaseous carbon dioxide stream 305 may be from carbon dioxide produced from chemical looping combustion of a fuel with an oxygen carrier where a pure stream of carbon dioxide is produced.

Figure 4:
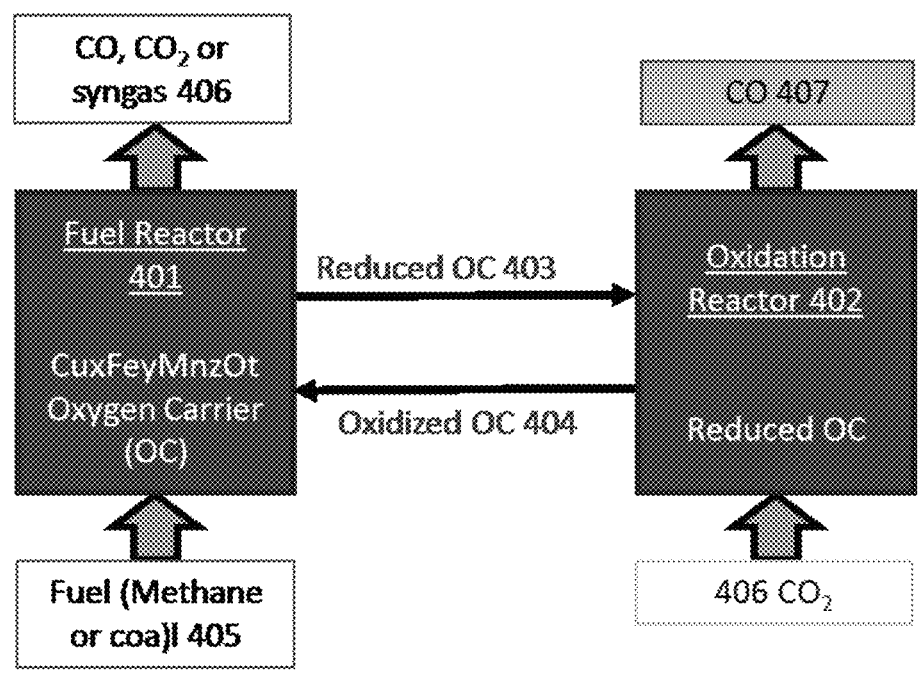
FIG. 4 depicts the process of chemical looping dry reforming with $Cu_xFe_yMn_zO_t$ using a fuel reactor to produce reduced $Cu_xFe_yMn_zO_t$ and synthesis gas, and an oxidation reactor for oxidation of reduced $Cu_xFe_yMn_zO_t$ with $CO_2$ to produce CO.

A system/process 400 within which the $Cu_xFe_yMn_zO_t$ oxygen carrier disclosed here may be utilized is illustrated at FIG. 4 which illustrates a chemical looping dry reforming of fuel with carbon dioxide system. $Cu_xFe_yMn_zO_t$ oxygen carrier 404 is placed in the fuel reactor 401. Fuel 405 (e.g. coal or methane) is introduced to the fuel reactor 401 for the reduction of metal ferrite oxygen carrier 404. Fuel reactor 401 is at a reducing temperature sufficient to reduce at least a portion of the metal ferrite oxygen carrier 404. In an embodiment, the reducing temperature is from about 500° C. to about 1100° C. The reactions involved in the fuel reactor 401 between $Cu_xFe_yMn_zO_t$ 404 and fuel 405 are illustrated in reactions [5-8]. When the fuel 405 is a solid fuel such as coal, steam may also be introduced with the fuel 205 to the fuel reactor 401 to promote the reduction reaction of $Cu_xFe_yMn_zO_t$ 404.

Within fuel reactor 401, $Cu_xFe_yMn_zO_t$ oxygen carrier interacts with fuel 405, and the reducing temperature is sufficient to reduce some portion of the $Cu_xFe_yMn_zO_t$ oxygen carrier and oxidize some portion of methane, generating products $CO_2$, CO or syngas 406 in the fuel reactor 401. The $CO_2$, CO or syngas products 406 are withdrawn from fuel reactor 401 as a product stream at exhaust, and the reduced carrier 403 may exit the fuel reactor. The reduced carrier 403 exiting fuel reactor may subsequently enter oxidation reactor 402. Oxidation reactor 402 further receives a flow of carbon dioxide 406, and facilitates contact between the reduced carrier 403 and carbon dioxide, generating a re-oxidized carrier 404 and a product stream CO 407. Oxidation reactor 402 is at an oxidation temperature sufficient to oxidize at least a portion of the reduced carrier by carbon dioxide. In an embodiment, the oxidizing temperature ranges from about 500° C. to about 1100° C.

Gaseous carbon dioxide stream 406 may be from carbon dioxide produced from chemical looping combustion of a fuel with an oxygen carrier where a pure stream of carbon dioxide is produced.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide description of inorganic materials, methods of their preparation, and methods for using such materials.

DESCRIPTION OF EMBODIMENTS

Material Preparation:

Reagent grade manganese (IV) oxide (44 μm) from Alfa Aesar, copper (II) oxide (10 μm) from Sigma Aldrich, and commercially available iron ore from Applied Minerals Inc. were used to synthesize the oxygen carriers. Stoichiometric quantities of the metal oxide powders were mechanically mixed and deionized water was added dropwise in a rotary mixer to form pellets in desired size range. These pellets were placed in alumina crucibles and heated at 2° C./min to 1000° C. and calcined between 800° C.-1000° C. for 6 hours. The preparation with the alumina support was performed by adding $Al_2O_3$ to obtain final composition with 20% alumina in copper-iron-manganese oxide. The mixture may be calcined between 800° C.-1200° C. for 6 hours.

Figure 5:
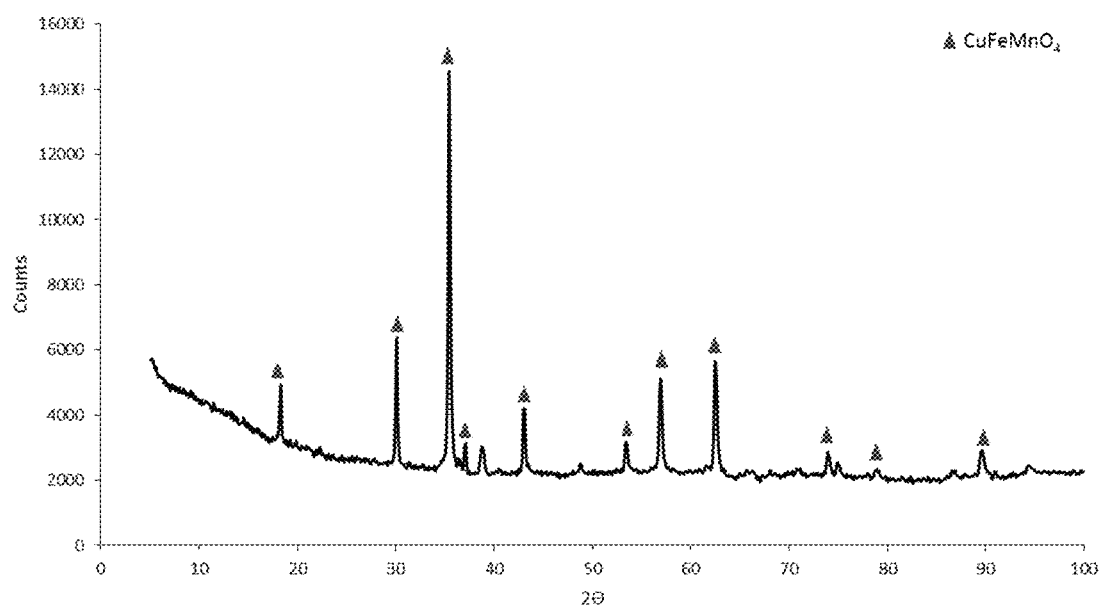
FIG. 5 depicts X-Ray diffraction data of $CuFeMnO_4$.

Material Characterization Cu—Fe—Mn Oxide:

The XRD data with Cu—Fe—Mn oxide prepared using equimolar Cu, Fe and Mn oxides shown in FIG. 5 indicated the presence of trimetallic phase $CuFeMnO_4$. The thermochemical data were obtained using simultaneous Differential Smayning calorimetry and Thermogravimetric Analysis (TGA) with methane temperature programmed reduction (TPR). Simultaneous DSC/TGA TPR with methane was conducted in a Thermal Analysis System Q 600 SDT (TA Instruments) to obtain the heat flow data and weight change data. The temperatures corresponding to endothermic and exothermic peak maxima, and reaction rate maxima during the temperature ramps in methane were determined from the data. Comparative data of the $CuFeMnO_4$ with single and bimetallic oxides are shown in Table 1. The $CuFeMnO_4$ system had unique reaction temperature maxima which were different from that with the single or bimetallic oxides. The distinct reduction pathway indicated that $CuFeMnO_4$ has a unique phase that performs differently from single or bimetallics.

TABLE 1

Reaction temperatures of metal oxide systems with methane during temperature ramps

| Metal Oxide System | Exothermic Reaction Temperature (° C.) | Endothermic Reaction Temperature (° C.) |
| --- | --- | --- |
| Copper Oxide | 876, 930 | None |
| Iron Oxide | None | 842, 980 |
| Manganese Oxide | 765 | None |
| Copper Iron Oxide | 830 | >1000 |
| Copper Manganese Oxide | 757 | 831 |
| Iron Manganese Oxide | None | >1000 |
| Copper Iron Manganese Oxide | 696 | 861 |

Syngas Production Performance Data:

The performance data on selective production of syngas with methane and trimetallic oxygen carriers comprising $CuMnFeO_4$ are illustrated at FIGS. 5-10.

Tests for chemical looping partial oxidation of methane as in Process 1 (FIG. 1) was conducted in a TGA and in a fixed bed flow reactor. A 10-cycle methane reduction/air oxidation TGA combined with effluent gas analysis with Mass Spectrometry was performed in a Thermal Analysis Systems Q50 TGA (TA Instruments). The effluent product stream was continuously monitored by a Pfeiffer Vacuum Omnistar Mass Spectrometer. For the 10-cycle reduction-oxidation test, approximately 60 mg of oxygen carrier with a particle diameter range of 40-60 mesh (425-250 μm) was placed on a platinum pan, purchased from TA instruments. Total flow was maintained at 100 SCCM throughout the duration of the experiment. During the reduction segment, 20% methane in UHP Ar was introduced to the TGA furnace. During purge segments, 80 SCCM of UHP Ar was introduced to the TGA and during oxidation 80 SCCM of zero grade air entered the TGA. The balance mass flow controller remained at 20 SCCM of UHP Ar throughout the duration of the experiment. As the 10-cycle reduction/oxidation experiment progressed, the weight change of the sample was monitored and the product gas composition was measured using the mass spectrometer.

Figure 6A:
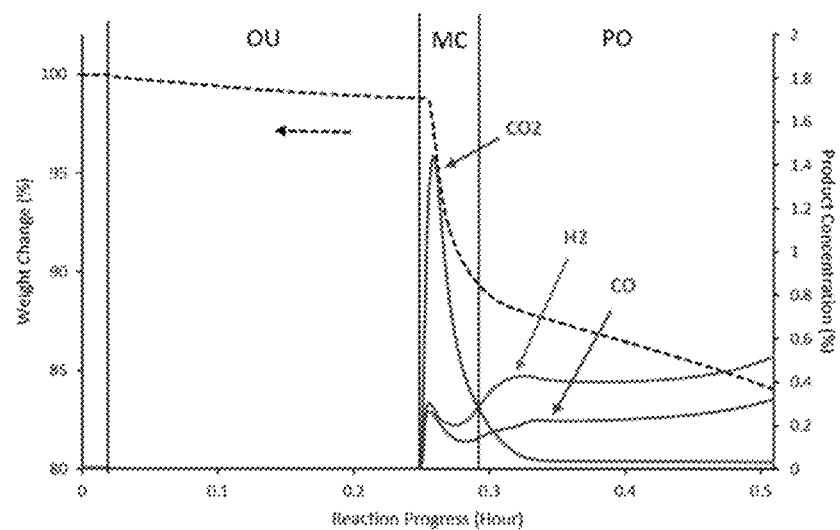
FIGS. 6A and 6B depicts the weight loss and effluent gas concentration data during 10th cycle TGA reduction with methane: the three highlighted regions were Oxygen uncoupling (OU) during Ar purge, methane combustion (MC), partial oxidation (PO) of methane $Cu_xFe_yMn_zO_t$ (FIG. 6A) and $Cu_xFe_yMn_zO_t$/20% Alumina at 800° C.
Figure 6B:
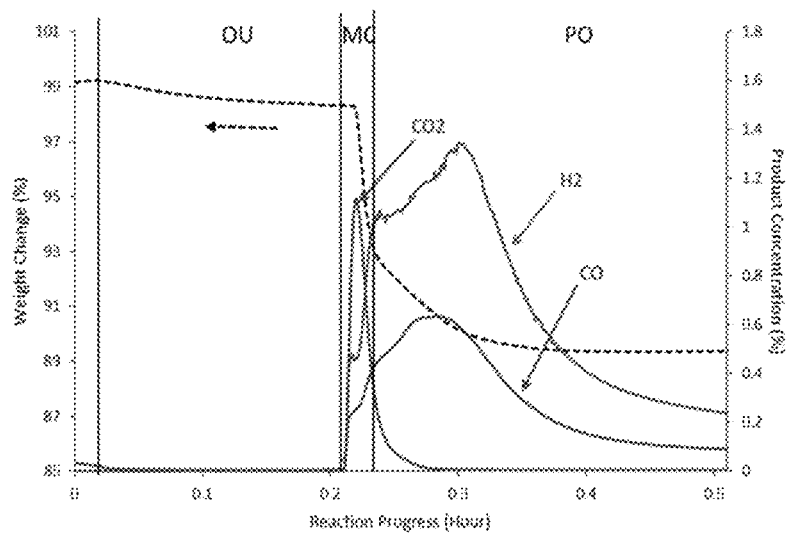

Isothermal 10-cycle TGA methane reduction and air oxidation experiments with mass spectrometer monitoring of the gaseous by-products conducted with $CuMnFeO_4$ and $CuMnFeO4/20\%$ alumina showed stable performance during the 10-cycle TGA test. The data for the $10^{th}$ reduction cycle at 800° C. are shown in FIG. 6. As shown in FIG. 6, initial rapid weight loss corresponded to the methane combustion (MC) in the section MC as indicated by the corresponding $CO_2$ peak in the mass spec. The second gradual weight loss corresponded to the production of syngas due to partial oxidation (PO) in section PO as also shown in FIG. 6. The time corresponded to the initial $CO_2$ formation was lower when $CuMnFeO_4$ was supported in 20% wt alumina than that with $CuMnFeO_4$ as also shown in FIG. 6. The syngas production rate was significantly higher with $CuMnFeO_4/20\%$ alumina than that with $CuMnFeO_4$ indicating the support has a beneficial effect on the syngas production rates.

Fixed bed flow reactor studies on reduction with methane and oxidation with air were conducted in a laboratory-scale fixed-bed reactor (Micromeritics model Autochem 2910 atmospheric flow reactor) at 14.7 psi (1.01×105 Pa). The sample (1 g) was placed in the reactor and heated to 750-850° C. in a flow of Helium and 20% methane in helium was introduced for reduction. After flushing the system with helium, air was introduced for oxidation. The outlet gas stream from the reactor was analyzed using a Pfeiffer Vacuum Omnistar mass spectrometer.

Figure 7A:
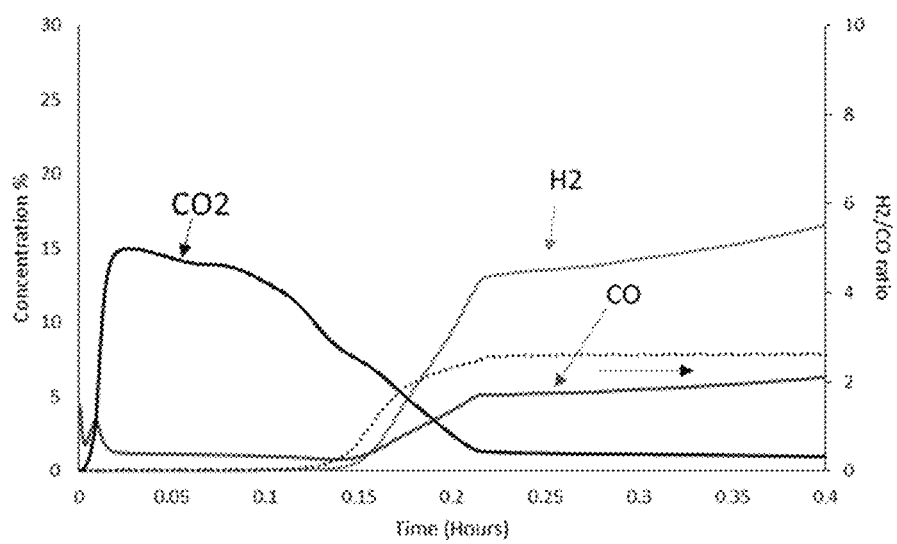
FIGS. 7A and 7B depicts the effluent gas concentrations during the $10^{th}$ cycle of fixed bed flow reactor chemical looping partial oxidation tests with $Cu_xFe_yMn_zO_t$ (FIG. 7A) and Cu—Fe—Mn Oxide Promoted with Alumina at 800° C. using 20% methane reducing gas and air as an oxidant (FIG. 7B)
Figure 7B:
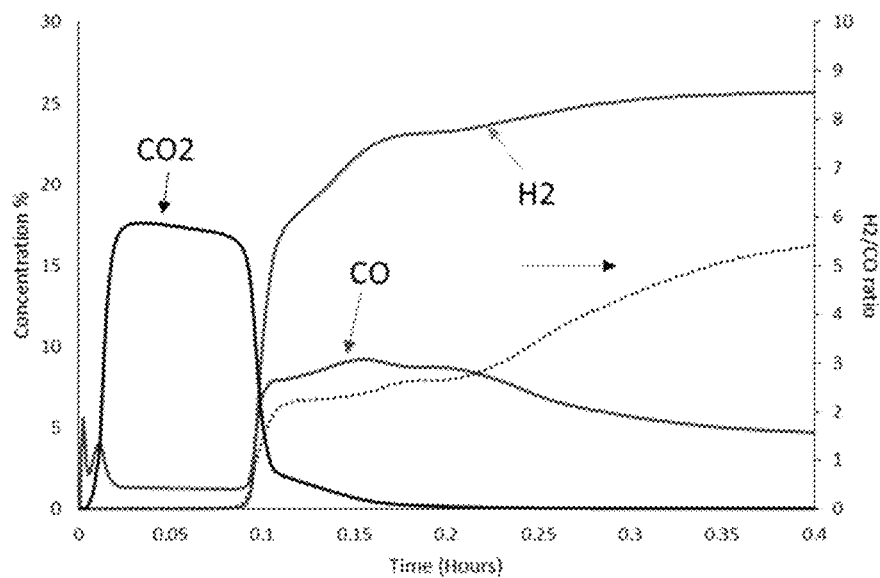
Figure 8A:
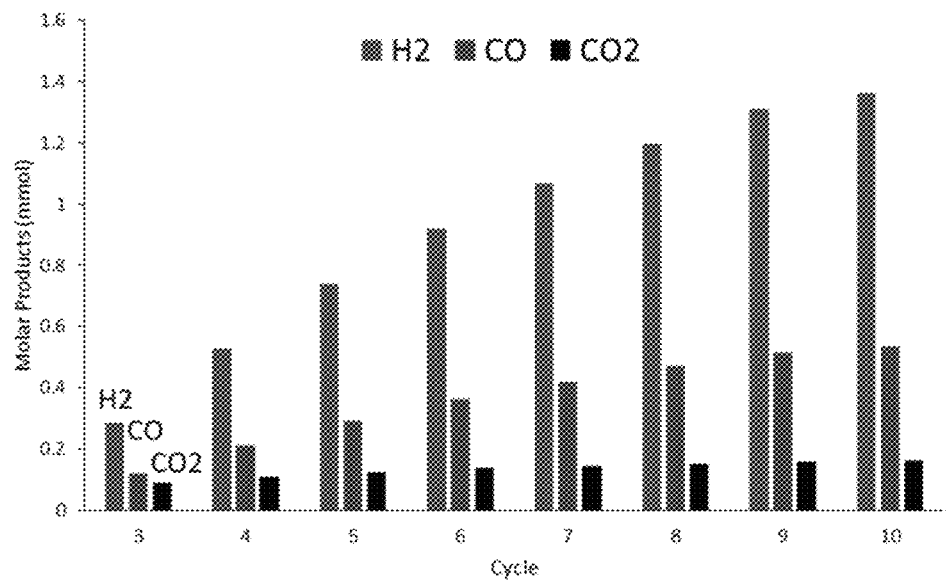
FIGS. 8A and 8B depicts the molar gas products during the partial oxidation portion of the 10-cycle methane/air test series in fixed bed flow reactor test for $Cu_xFe_yMn_zO_t$ (FIG. 8A) and $Cu_xFe_yMn_zO_t$/20% Alumina at 800° C.
Figure 8B:
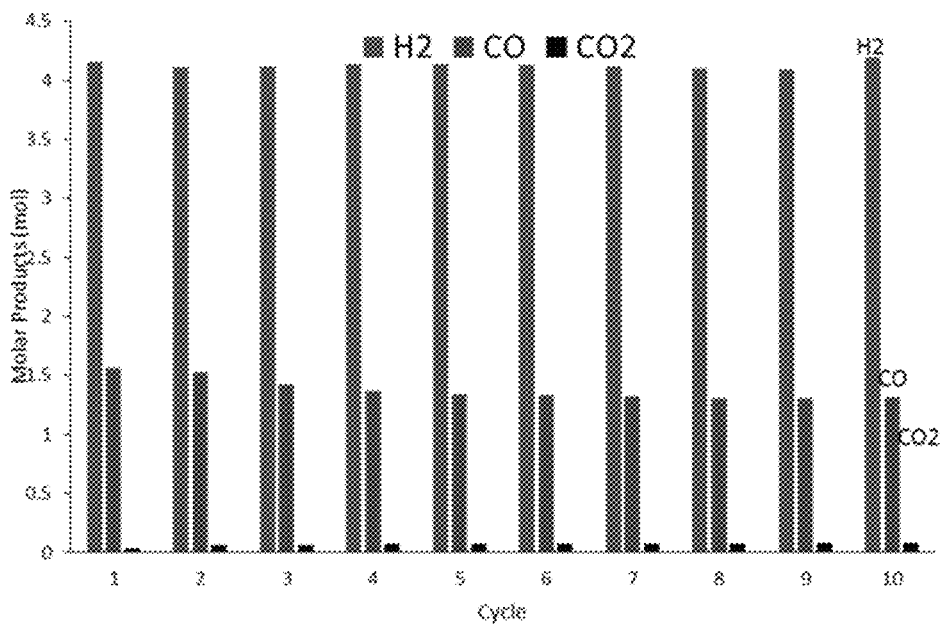

The concentrations of the effluent gas during the $10^{th}$ cycle of methane CL partial oxidation (PO section) in the fixed bed reactor with $CuMnFeO_4$ and $CuMnFeO_4/20\%$ alumina are shown in FIG. 7. The fixed bed flow reactor test data are consistent with that with the TGA data. For $CuMnFeO_4$, there was $CO_2$ formation prior to the $H_2$ and CO production and the syngas production continued to increase. Similar observation was made at 750° C. but the syngas concentrations were lower at 750° C. than that at 800° C. The syngas production rate was significantly higher with $CuMnFeO_4/20\%$ alumina than that with $CuMnFeO_4$ which was consistent with the TGA data. The molar gas yields of the partial oxidation portion during the $10^{th}$ cycle at methane/air 800 C tests are shown in FIG. 8. The data indicated that there was a stable production of syngas during the 10-cycle test. The molar production of syngas and selectivity for syngas production were significantly higher with $CuMnFeO_4/20\%$ alumina than that with $CuMnFeO_4$.

In order to avoid the initial $CO_2$ formation due to methane combustion, controlled oxidation was conducted after the reduction step. Instead of fully oxidizing the reduced $CuMnFeO_4$ with air (20 min), the oxidation was only performed for 2 min. The methane partial oxidation reaction data after controlled oxidation of the oxygen carrier is shown in FIG. 9. The initial $CO_2$ formation was avoided as indicated by the minimal $CO_2$ production and it was possible to obtain selective formation of syngas with $H_2/CO$ ratio of 2.

Figure 10:
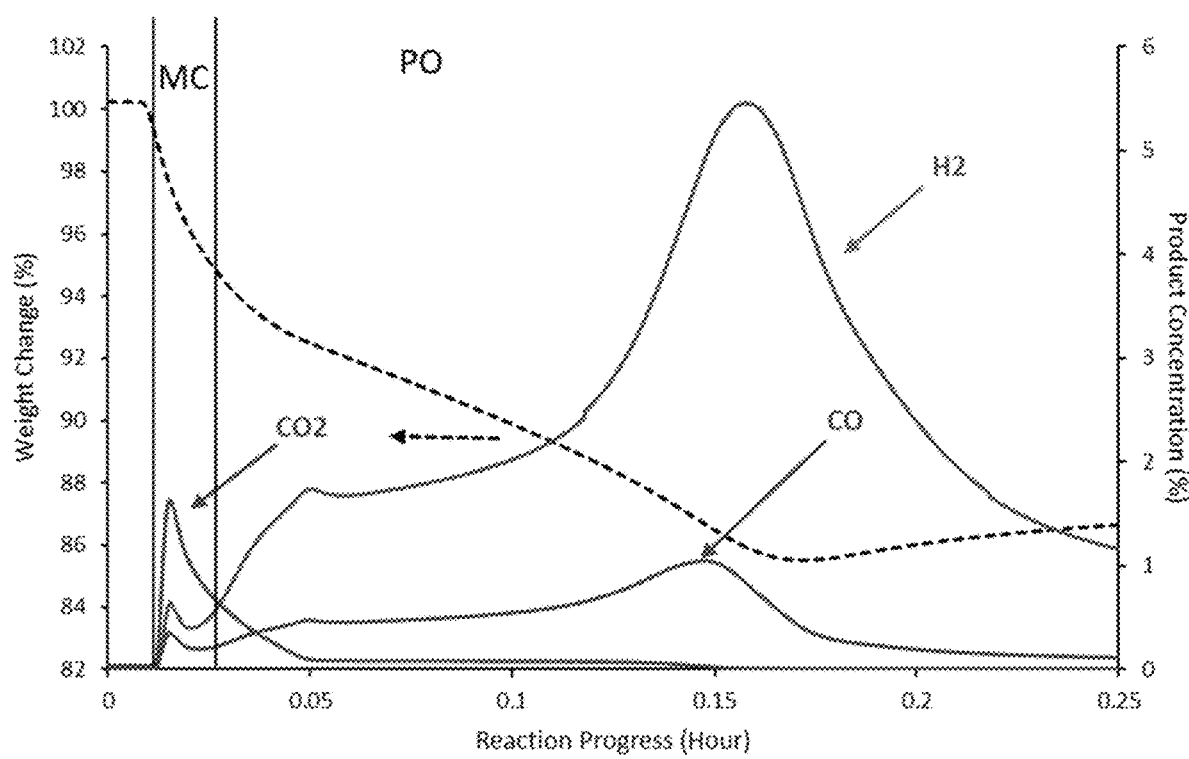
FIG. 10 depicts TGA weight change and effluent gas concentrations during the 5$^{th}$ cycle reduction of chemical looping partial oxidation tests with FeMnO$_x$ impregnated with copper nitrate.
Figure 11:
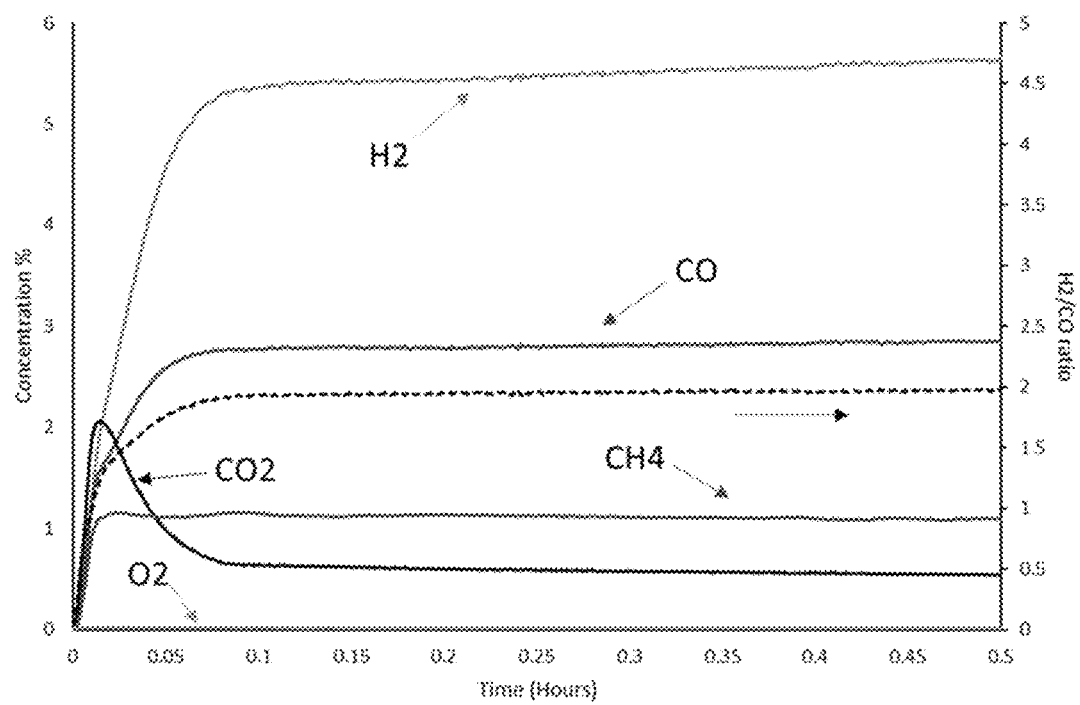
FIG. 11 depicts the effluent gas concentrations during the catalytic methane partial oxidation test with Cu$_x$Fe$_y$Mn$_z$O$_t$ (1 g) with a continuous flow of 5 vol. % CH$_4$/2.5% O$_2$/He at 900° C.

Fixed bed flow reactor test data were conducted with trimetallic formulations $Cu_xFe_yMn_zO_t$ prepared using different molar compositions of single metal oxides of CuO, $Fe_2O_3$ and $Mn_2O_3$. Oxygen transfer capacity, syngas selectivity and methane conversion data from the flow reactor tests are shown in Table 2.

conducted with $CuMnFeO_4$ using a continuous flow of oxygen and methane at 900° C. Chemical looping oxygen uncoupling (CLOU) materials such as CuO may decompose when heated to produce a stream of oxygen. Equilibrium concentration of 1.5 vol. % $O_2$ may be reached at 900° C. for $CuO/Cu_2O$ system, whereas the equilibrium concentration increases up to 12.4 vol. % at 1000° C. To simulate this process in which gaseous oxygen is introduced to methane via CLOU process, 5% vol.$CH_4$/2.5% $O_2$/He was introduced to 1 g of $CuFeMnO_4$ at 900° C. for 120 minutes. The effluent gas composition during the reaction is shown in FIG. 10. As shown in FIG. 11, the production of CO and $H_2$ concentrations was steady during the 120-min test. A methane conversion of more than 74% was observed, with almost complete O2 utilization. In addition, carbon formation was not observed. By optimizing the concentrations of methane and oxygen, and the amount of $CuFeMnO_4$ to gas ratio it will be possible to obtain the desired $H_2/CO$ ratio in a steady continuous operation. These data demonstrated that it is possible to supply a continuous stream of oxygen and methane for the partial oxidation process with $CuFeMnO_4$ as shown in Process 2 (FIG. 2) to obtain continuous production of synthesis gas.

In order to demonstrate the catalytic dry reforming methane with $CO_2$ in the process 300 in FIG. 3, fixed bed flow reactor studies were conducted in a laboratory-scale fixed-bed reactor (Micromeritics model Autochem 2910 atmospheric flow reactor) at 14.7 psi (1.01×105 Pa). Chemical looping combustion of a fuel with an oxygen carrier may provide a pure gaseous stream of carbon dioxide and heat for this process. The $CuFeMnO_4$ oxygen carrier (1 g) was placed in the reactor and heated to 800° C. in a flow of Helium. At the final reaction temperature, 20% methane in Helium was introduced for 20 minutes. Then 11% methane and 11% $CO_2$ were introduced for 2 hours at 800° C. for the dry reforming reaction. The outlet gas stream from the

TABLE 2

Effect of metal composition on syngas production: fixed bed reactor data for various compositions of Cu—Fe—Mn oxides at 800° C.

| | CuFeMnOx 20 wt % $Al_2O_3$ | CuFeMnOx | CuFe0.5Mn1.5x | CuFeMn2Ox | CuFe2MnOx |
|---|---|---|---|---|---|
| O2 Transfer Capacity % | 3.58 | 1.95 | 1.92 | 3.04 | 4.54 |
| Selectivity | 0.99 | 0.95 | 0.94 | 0.94 | 0.84 |
| CH4 Conversion % | 73.34 | 55.74 | 50.78 | 32.64 | 31.83 |

The best performance was observed with the formulation, $CuFeMnO_4$ prepared using equimolar concentration of respective oxides.

Chemical looping syngas production from methane was also conducted with formulations prepared by impregnating the bimetallic oxides. The oxygen carrier with the composition FeMnx was first prepared by mixing the respective single metal oxides and calcining the mixture at 1000° C. Then the oxide was impregnated with copper nitrate and pellets were calcined at 900° C. in nitrogen. The TGA chemical looping experiments were conducted with 20% methane/air. The performance on syngas production improved during the cyclic tests and the optimum performance was observed at the $5^{th}$ cycle. The synthesis gas production data at the $5^{th}$ cycle is shown in FIG. 10. High syngas production was also observed with this formulation.

Figure 12:
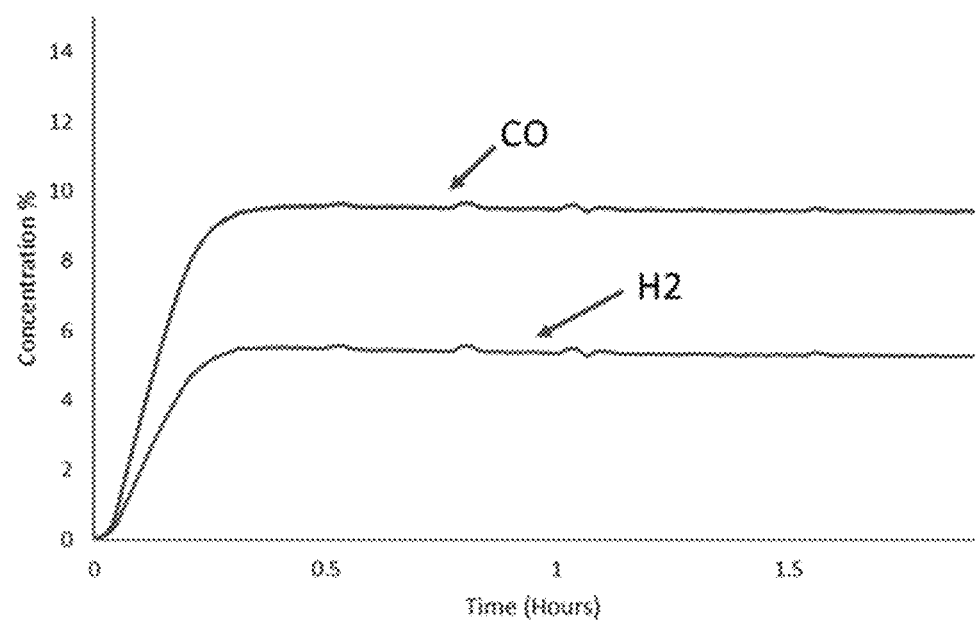
FIG. 12 depicts the effluent gas concentration during continuous production of syngas from methane dry reforming of Cu$_x$Fe$_y$Mn$_z$O$_t$ at 800° C. with 11% methane and 11% CO$_2$.

In order to demonstrate the catalytic partial oxidation process 200 in FIG. 2, fixed bed flow reactor tests were reactor was analyzed using a mass spectrometer (Pfeiffer-Vacuum Thermostar). Performance data on catalytic dry reforming methane with $CO_2$ with $CuFeMnO_4$ oxygen carrier 800° C. is shown in FIG. 12. When methane and $CO_2$ were introduced at 800° C., $H_2$ and CO were formed. The performance was very stable during the 2-hour test.

Figure 13:
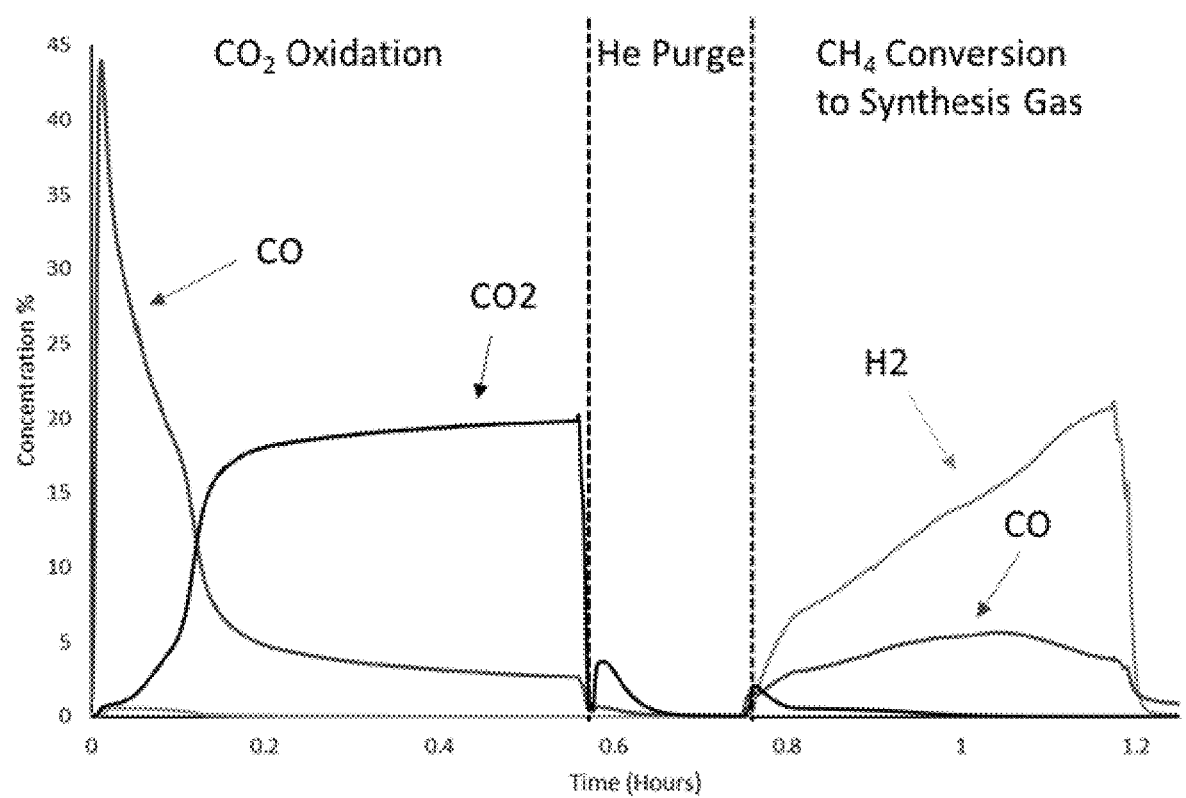
FIG. 13 depicts data during chemical looping dry reforming tests with methane/CO$_2$; Effluent CO and CO$_2$ concentrations during introduction of 23.3% CO$_2$ at 800° C. to reduced Cu$_x$Fe$_y$Mn$_z$O$_t$ and Effluent H$_2$ and CO concentrations during introduction of 16.6% methane at 800° C.

In order to demonstrate the chemical looping dry reforming process 400 in FIG. 4, fixed bed flow reactor studies were conducted in a bench scale flow reactor. Chemical looping combustion of a fuel with an oxygen carrier may provide a pure stream of carbon dioxide and heat for this process. Fixed bed flow reactor studies were conducted in a laboratory-scale fixed-bed reactor (Micromeritics model Autochem 2910 atmospheric flow reactor) at 14.7 psi (_1.01×105 Pa). The $Cu_xFe_yMn_zO_t$ (80%)-Alumina (20%) oxygen carrier (1 g) was placed in the reactor and heated to 800° C. in a flow of Helium (30 sccm). At the final reaction temperature, 16.3% methane in Helium was introduced (total flow rate 30 sccm) until CO concertation started to decrease. After flushing the system with He, 23.3% $CO_2$ in He was introduced at 800° C. for the dry reforming reaction. The outlet gas stream from the reactor was analyzed using a mass spectrometer (PfeifferVacuum Thermostar). Performance data on chemical looping dry reforming methane and $CO_2$ with CuFeMnO4 oxygen carrier 800° C. is shown in FIG. 13. A significant amount of CO was observed when CO2 was introduced and when methane was introduced $H_2$ and CO were formed. The data indicated that the reduced $Cu_xFe_yMn_zO_t$ may be oxidized using CO2 while forming CO.

Embodiments of the present invention provide one or more of the following:

- Use of trimetallic $Cu_xFe_yMn_zO_t$ oxygen carrier where $0<x\leq 3$ and $0<y\leq 3$ and $0<z\leq 3$ and, $0<t\leq 5$ to produce nitrogen free synthesis gas via chemical looping partial oxidation of methane is described. The process involves reacting the $Cu_xFe_yMn_zO_t$ with methane to form synthesis gas followed by oxidation of the reduced trimetallic $Cu_xFe_yMn_zO_t$ with air.
- Good synthesis gas yields in the $H_2$/CO ratio of 2:1 which is useful for chemical production may be obtained.
- High oxygen transfer capacity for the process was observed with $Cu_xFe_yMn_zO_t$
- Stable reactivity was observed during the multiple cycles.
- Incorporation of Al2O3 in $Cu_xFe_yMn_zO_t$ oxygen carrier improved the syngas production rates significantly
- Preparation of the oxygen carrier may be performed by mixing the single oxides, adding water to make pellets and calcining the pellets
- Preparation may also be done by first preparing the bimetallic oxide and impregnating it with the metal salt containing the third metallic ion.
- Trimetallic $Cu_xFe_yMn_zO_t$ oxygen carrier, with or without a support, may also be used as a catalyst for the continuous reaction of methane with gaseous oxygen to obtain continuous production of synthesis gas.
- Trimetallic $Cu_xFe_yMn_zO_t$ oxygen carrier, with or without a support, may also be used as a catalyst for the continuous dry reforming reaction of methane and carbon dioxide to obtain continuous production of synthesis gas.
- Trimetallic $Cu_xFe_yMn_zO_t$ oxygen carrier, with or without a support, may also be used as an oxygen carrier for the chemical looping dry reforming reaction of methane or other fuel and carbon dioxide to obtain continuous production of synthesis gas.
- Trimetallic $Cu_xFe_yMn_zO_t$ oxygen carrier, with or without support, are environmentally safe unlike Ni based materials reported for the process in the past.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A method for partial oxidation of methane to produce synthesis gas comprising:

delivering a trimetallic oxygen carrier to a fuel reactor, where the trimetallic oxygen carrier comprising $Cu_xFe_yMn_zO_t$ where $0<x\leq 3$ and $0<y\leq 3$ and $0<z\leq 3$ and, $0<t\leq 5$;

delivering a gaseous stream that contain methane to the trimetallic oxygen carrier in the fuel reactor and maintaining the fuel reactor at a reducing temperature, where the reducing temperature is sufficient to reduce some portion of the trimetallic oxygen carrier forming a reduced trimetallic oxygen carrier and partially oxidize some portion of the methane containing gas stream, and generating gaseous products containing $H_2$ and CO gas in the fuel reactor;

withdrawing a product stream from the fuel reactor, where the gaseous products comprise the product stream, and where at least >50 vol. % of the product stream consists of CO and $H_2$, oxidizing the reduced trimetallic oxygen carrier fully or partially by contacting the reduced carrier and an oxidizing gas at an oxidizing temperature, where the oxidizing gas is comprised of oxygen, and where the oxidizing temperature is sufficient to generate an oxidizing reaction, where the reactants of the oxidizing reaction comprise some portion of the oxygen, some portion of the oxygen depleted form of $Cu_xFe_yMn_zO_t$, and reduced forms of single or bimetallic components of Fe, Mn or Cu, and where the product of the oxidizing reaction is a re-oxidized carrier comprising some portion of the $Cu_xFe_yMn_zO_t$ or partially oxidized form of $Cu_xFe_yMn_zO_t$ and delivering heat generated from the oxidizing reactor to the fuel reactor for the reaction of trimetallic $Cu_xFe_yMn_zO_t$ with methane.

2. The method of claim 1 where the reducing temperature ranges from about 700° C. to about 1100° C.

3. The method of claim 1 where the $Cu_xFe_yMn_zO_t$ is initially reduced by a fuel forming a partially reduced form that reacts with methane to form synthesis gas.

4. The method of claim 1 where the oxygen carrier comprises at least 30 wt. % of the trimetallic $Cu_xFe_yMn_zO_t$ oxide.

5. The method of claim 1 where the trimetallic oxygen carrier is selected from the group consisting of $CuMnFeO_4$, $CuFe_{0.5}Mn_{1.5}O_4$, $CuFeMn_2O_4$, $CuFe_2MnO_4$ or Cu impregnated on $Fe_rMn_sO_u$, Fe impregnated on $Cu_rMn_sO_u$, Mn impregnated on $Cu_rFe_sO_u$, where r>0, s>0 and u>0 and combinations thereof.

6. The method of claim 1 where the trimetallic oxygen carrier further comprises a support, where the support comprises from about 5 wt. % to about 60 wt. % of the trimetallic oxygen carrier.

7. The method of claim 6 where the support may contain alumina, silica, zirconia, clay, titania, MgO, CaO, monoliths and combinations there of.

8. The method of claim 1 where the methane concentration may be greater than 5 vol. %.

9. The method of claim 1 where mixing the methane containing gas stream and the trimetallic oxygen carrier in the fuel reactor step generates a reduced carrier, where the reduced carrier comprises the oxygen depleted form selected from the group consisting of $Cu_xFe_yMn_zO_t$, FeO, $Fe_3O_4$, $Cu^0$, $Cu_2O$, $Mn^0$, MnO, and $Mn_3O_4$ components.

10. The method of claim 1 where oxidization of the reduced $Cu_xFe_yMn_zO_t$ carrier occurs in an oxidizing reactor, and further comprising:

transferring the reduced carrier from the fuel reactor to the oxidizing reactor;

supplying the oxidizing gas to the oxidizing reactor, thereby generating the re-oxidized carrier;

transferring the re-oxidized carrier from the oxidizing reactor to the fuel reactor; and repeating delivery of the trimetallic $Cu_xFe_yMn_zO_t$ oxygen carrier to the fuel reactor, introducing methane to the trimetallic $Cu_xFe_yMn_zO_t$ oxygen carrier in the fuel reactor, and the withdrawing the product stream from the fuel reactor.

11. The method of claim 10 where the oxidizing temperature ranges from about 700° C. to about 1100° C.

* * * * *